(12) United States Patent
Lipton

(10) Patent No.: US 6,519,088 B1
(45) Date of Patent: Feb. 11, 2003

(54) METHOD AND APPARATUS FOR MAXIMIZING THE VIEWING ZONE OF A LENTICULAR STEREOGRAM

(75) Inventor: Lenny Lipton, Greenbrae, CA (US)

(73) Assignee: StereoGraphics Corporation, San Rafael, CA (US)

( * ) Notice: Subject to any disclaimer, the term of this patent is extended or adjusted under 35 U.S.C. 154(b) by 0 days.

(21) Appl. No.: 09/889,433

(22) PCT Filed: Jan. 21, 2000

(86) PCT No.: PCT/US00/01558

§ 371 (c)(1),
(2), (4) Date: Feb. 20, 2002

(87) PCT Pub. No.: WO00/43821

PCT Pub. Date: Jul. 27, 2000

(51) Int. Cl.[7] .............................. G02B 27/22; A61B 3/08
(52) U.S. Cl. ..................... 359/463; 359/462; 359/466; 351/201
(58) Field of Search ................................ 359/462, 463, 359/464; 348/59, 55; 351/201

(56) References Cited

U.S. PATENT DOCUMENTS 5,528,420 A * 6/1996 Momochi .................... 359/463
5,543,965 A * 8/1996 Bielinski et al. ............ 359/463

* cited by examiner

Primary Examiner—Audrey Chang
(74) Attorney, Agent, or Firm—Dergosits & Noah LLP; Richard A. Nebb

(57) ABSTRACT

A lenticular stereogram has an improved viewing zone for a specific viewing distance when an image print (207) having an optimum image column width is utilized. The optimum image column width is determined by observing a series of two color prints having variable image column widths mounted under a lenticular screen (206) through an imaging apparatus.

16 Claims, 4 Drawing Sheets

METHOD AND APPARATUS FOR MAXIMIZING THE VIEWING ZONE OF A LENTICULAR STEREOGRAM

FIELD OF THE INVENTION

This invention relates to three dimensional stereoscopic print images, also known as lenticular stereograms or parallax panoramagrams, and more particularly, to a method and apparatus for increasing the viewing zone of images in lenticular stereograms.

BACKGROUND OF THE INVENTION

Lenticular stereograms have been used for many years to display a true three-dimensional stereoscopic image without the need for the observer to wear special selection devices which selectively permit the left eye and right eye to see different images. Selection devices are typically eyeglasses that are colored (red/green) or polarized so that a left image and a right image can be viewed from one source. The lenticular stereogram is made by photomechanical reproduction and most commonly used for trading cards, picture postcards, product displays, and the like. By incorporating a cylindrical lenticular screen which has a corduroy-like surface over a properly encoded image print, a stereoscopic three dimensional depth effect may be achieved.

As shown in FIG. 1A, the lenticules 101 have semi-cylindrical surfaces oriented so that their lengths are aligned vertically. The lenticules are in intimate juxtaposition with a print image 102, which contains columns of encoded visual information. Each column of the print image 102 is associated with a particular lenticule, and each column has a series of views ranging from a leftmost to a rightmost perspective. Thus, instead of seeing a single image as in a normal print, the observer of a panoramagram will see perspective images for both the left and right eyes due to the refractive nature of the lenticular surface of the panoramagram. More specifically, because the left eye views the lenticular stereogram from different angles than the right eye, each eye has a different view of the image creating a three dimensional image.

Although the art of making lenticular stereograms is continuing to advance, a number of persistent problems remain which inhibit the medium from becoming more pervasive. In particular, lenticular stereograms have a limited range of points at which they can be viewed without degradation of the three-dimensional image due to the parallax effect. To properly view the entire print or display, all columnar structured images and associated columnar lenticules must be in intimate juxtaposition. The center of an image is typically viewed at a near perpendicular angle, while the left and right edges of the image may be viewed at much more acute angles. The parallax effect occurs at acute viewing angles and creates a lack of precise juxtaposition between the columnar structured image and the associated columnar lenticules. The lack of juxtaposition occurs because at a highly acute angle, the focal point of the lenticule is not properly on the associated print column and an inaccurate columnar image is viewed.

The range of points at which the full and accurate three-dimensional lenticular stereogram image can be seen is known as the "viewing zone." There have been prior art attempts to maximize the viewing zone by reducing the parallax effect. For example, U.S. Pat. No. 5,838,494 discloses a mathematical technique for adjusting the width of the print columns to match the width of the lenticular screen to optimize the viewing zone, but requires obtaining screens with precise lenticule width dimensions. U.S. Pat. No. 5,083,199 requires an air gap to improve the lenticular stereogram viewing zone and it is not clear if paper prints will work with this method. Also, the lenticular screen is imposed on a curved structure with varying lenticule widths which is very difficult to manufacture. The article by E. Sandor et al. entitled "Technical Info on PHSColorgrams®" (see generally http://www.artn.nwu.edu) discloses increasing the viewing zone of a lenticular stereogram by using print columns which are wider than the width of their corresponding lenticules but does not disclose a method for coordinating the width of the print with the width of the lenticules. Thus, none of these references provides a simple solution for maximizing the viewing zone of a lenticular stereogram.

The present invention sets out to provide a simple method for increasing the viewing zone of a lenticular stereogram.

SUMMARY OF THE INVENTION

The present invention is a simple method for increasing the viewing zone of a stereographic image which may be a photographic print, a projected or computer-generated image, or any other type of graphical image. The viewing zone is improved by determining the optimum column width for the image columns of the stereographic image. The optimum column width provides optical alignment for each column with its corresponding lenticule for a specified viewing position. The optimum column width may be determined empirically with a series of test images. Once determined, stereographic images having the optimum column width can be produced using an interdigitation program.

Each test image has a plurality of columns each corresponding to a single lenticule of the lenticular screen. Each column has two single color stripes where the colors are discernible or visually distinct from each other. The colored stripes thus alternate over the complete width of the test image.

The optimum column width is determined by viewing the test image and lenticular screen with a viewing apparatus having a left eye viewing position and a right eye viewing position. When the image appears to be one color when observed from the left eye viewing position and the other color when observed from the right eye viewing position, then the optimum column width has been achieved. The test image having the optimum column width can be determined by viewing a series of such test images having different column widths. Stereographic images can then be produced using the optimum column width and the viewing zone will be maximized when a center column of the stereographic image is aligned with a center lenticule of the lenticular screen.

DETAILED DESCRIPTION OF THE INVENTION

Figure 1B:
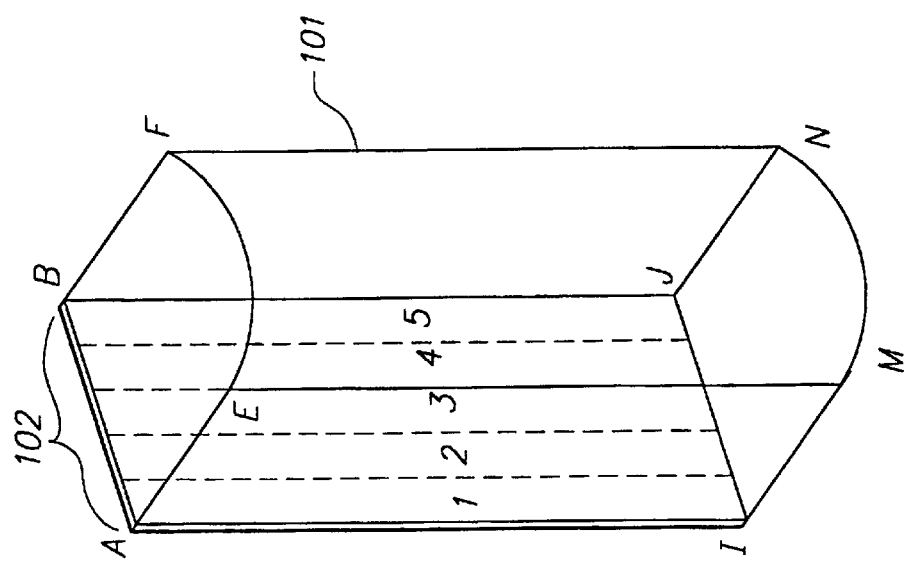
FIG. 1B is a perspective drawing showing the structure of an individual lenticule and corresponding interdigitated image from the structure of FIG. 1.
Figure 1A:
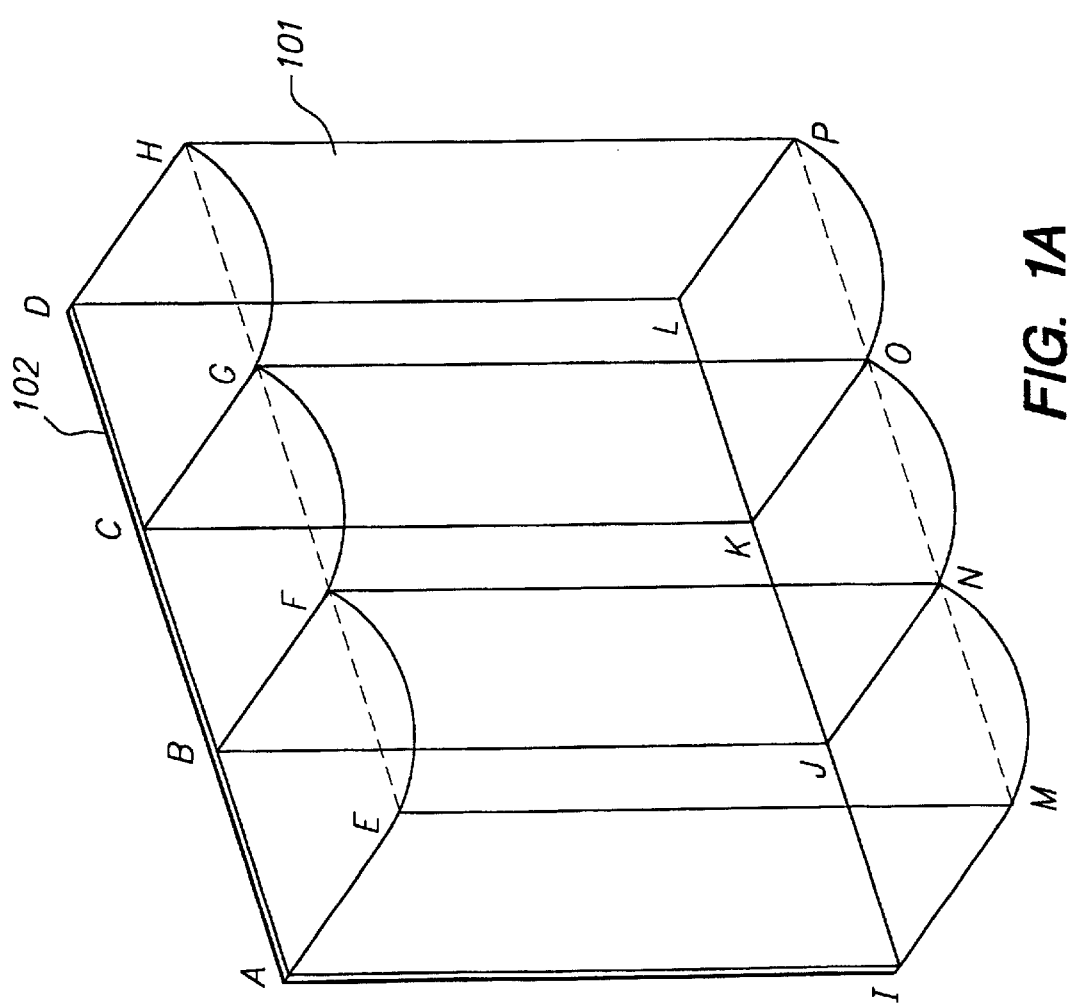
FIG. 1A is a perspective drawing showing the structure of a lenticular stereogram.

Referring to FIG. 1A, a portion of a lenticular screen 101 and associated print 102 is illustrated. The term "print" is used broadly to signify any well-known displays, such as a rear-projected display, a photographic print, a photomechanically-reproduced print, or an electronic display screen, as well as combinations of these known displays. The print 102 is fixed in intimate juxtaposition with the lenticular screen 101 such that two parallel planes are referenced: the plane of print 102 is defined by points ADLI and the reference plane of the lenticules is defined by points EHPM. The lenticules are individual cylindrical lenses, EFNM, FGON and GHPO having cylindrical surfaces illustrated as equal radius arcs EF, FG and GH, and corresponding arcs MN, NO and OP respectively. The lenticule screen is overlaid on top of reference plane EHPM and each lenticule is optically aligned in intimate juxtaposition with a corresponding rectangular print area on print 102 to provide different images or views from different viewing angles. For example, print area ABJI is directly behind and intimate juxtaposition with lenticule EFNM.

Referring to FIG. 1B, a more detailed illustration of the print area ABJI and corresponding lenticule EFNM is shown. The print area 102 is subtended by five columns or stripes 1, 2, 3, 4 and 5. Any number of columns may be used, but for simplicity only five columns are illustrated. Because of the optical properties of the lenticule, only one stripe can be seen from any one viewing position. Stripe 1 contains the rightmost view and as the point of view moves from right to left stripes 2, 3, 4 and 5 are viewed sequentially.

The production of this kind of interdigitated stereogram print is well understood. In the exemplary five column stereogram, five perspective views are produced by five cameras pointing straight ahead equidistant from each other and taking photographic images simultaneously. These images may be either captured digitally or by conventional photographic means and then digitally scanned. These digital images are then sliced up using an interdigitation software algorithm and reassembled as a stereogram print. The stereogram print is fabricated by having individual perspective image views interdigitated (sometimes mistakenly referred to as "interleaved") so that the print area which corresponds to a particular lenticule is made up of a number of discrete stripes. When viewing a lenticular stereogram made up of five interdigitated images, five distinct image views may be seen by looking at the lenticular stereogram from five different ranges of angles. Interdigitation algorithms and software are well known in the art. An exemplary interdigitation algorithm is described in detail in International Publication No. WO 98/27456 which is hereby expressly incorporated by reference.

Figure 3A:
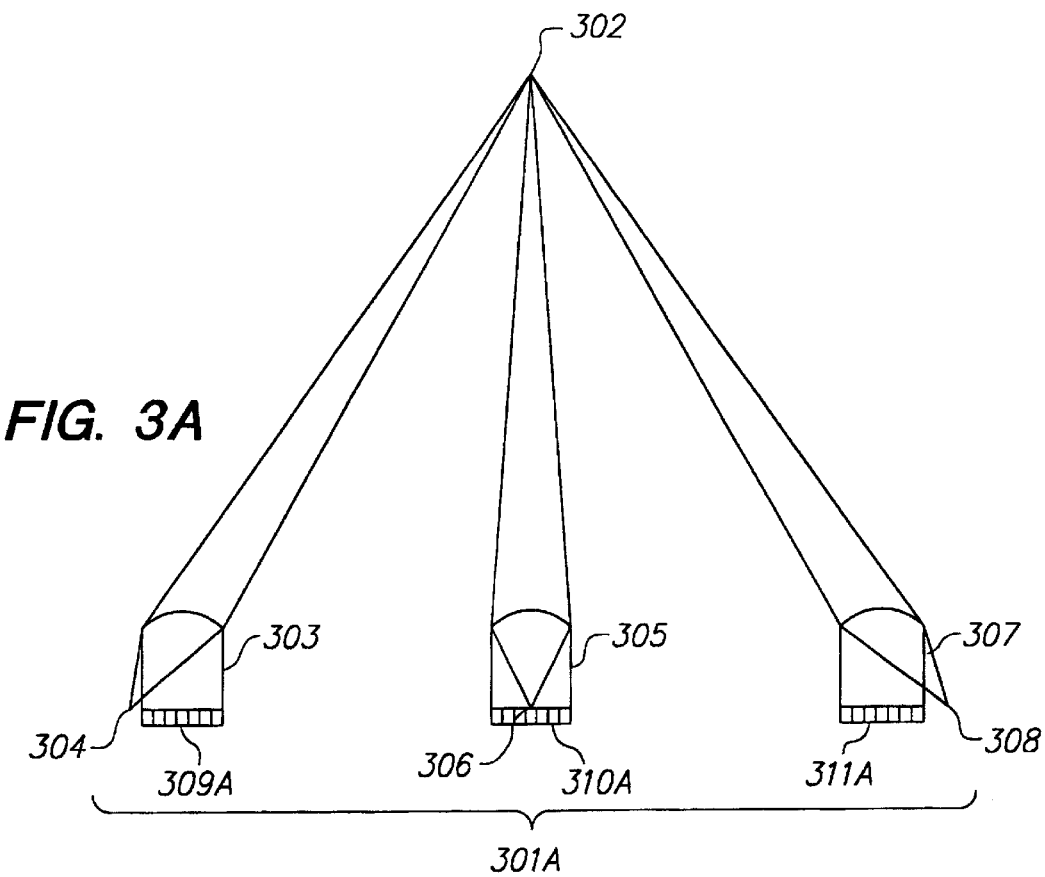
FIG. 3A is a schematic representation of a lenticular screen and print columns viewed from an observation point without making the necessary adjustment to optimize the viewing angle.

FIG. 3A illustrates the parallax problem. A lenticular print is shown to be within the extent of bracket 301A. For simplicity, only three representative lenticules 303, 305, and 307 and their corresponding print areas 309A, 310A and 311A are illustrated. As discussed, any number of lenticules and columns may be used. An observation point 302 is centrally located with an on-axial view of the lenticular print, directly above the central lenticule 305. (A perpendicular dropped from observation point 302 would intersect the horizontal center of the print and lenticule 305.) Rays of light which are observed from observation point 302 are refracted by lenticules 303, 305 and 307 and have focal points at 304, 306 and 308, respectively. The parallax problem in this example results from the focal points 304 and 308 being out of alignment with their corresponding print areas. In FIG. 3A, the focal points 304 and 308 are completely off of the print areas 309A and 311A respectively and therefore not viewed at all from observation point 302. Thus, only the print image near the central area 310A appears to be stereoscopic. Images on either side of the center of the print may appear to be distorted or confusing because the eyes will be seeing portions of columns and their correspond stripes that do not correspond to a proper stereoscopic image. Under such circumstances the eyes might well be seeing a left image with the right eye and a right image with the left eye. Thus, without precise corrective shifting of the print columns relative to the lenticules, the range of viewing angles within the viewing zone is substantially reduced.

Figure 3B:
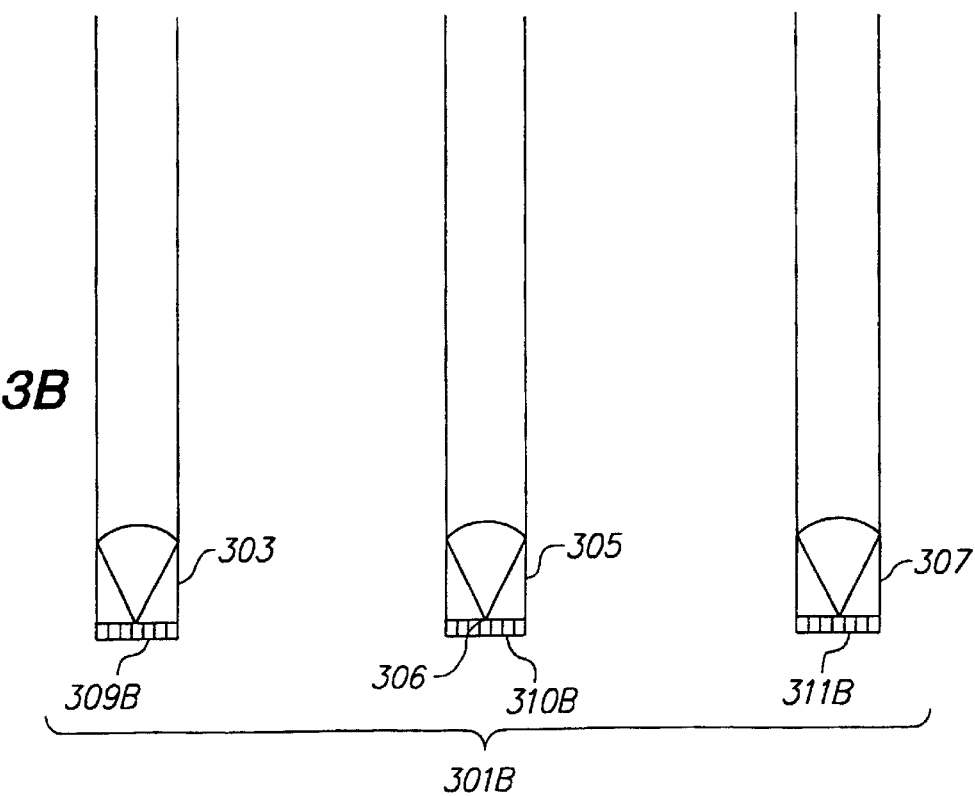
FIG. 3B is a schematic representation of a lenticular screen and print columns viewed from a remote observation point.

The parallax problem diminishes as the distance between the observation point 302 and the print increases. Referring to FIG. 3B, if the observation point (not shown) is a substantial distance from the print, the light rays from the lenticules to the observation point are more parallel and the focal points 304, 306 and 308 fall within the print areas 309B, 310B and 311B, respectively. From this observation point, the print areas 309B and 311B do not require shifting because the parallax problem does not exist and edges of prints. Thus, to avoid the parallax problem, lenticular screens of greater width must be viewed from greater distances than narrower prints to reduce the acute viewing angle at the left and right sides of the print.

Figure 3C:
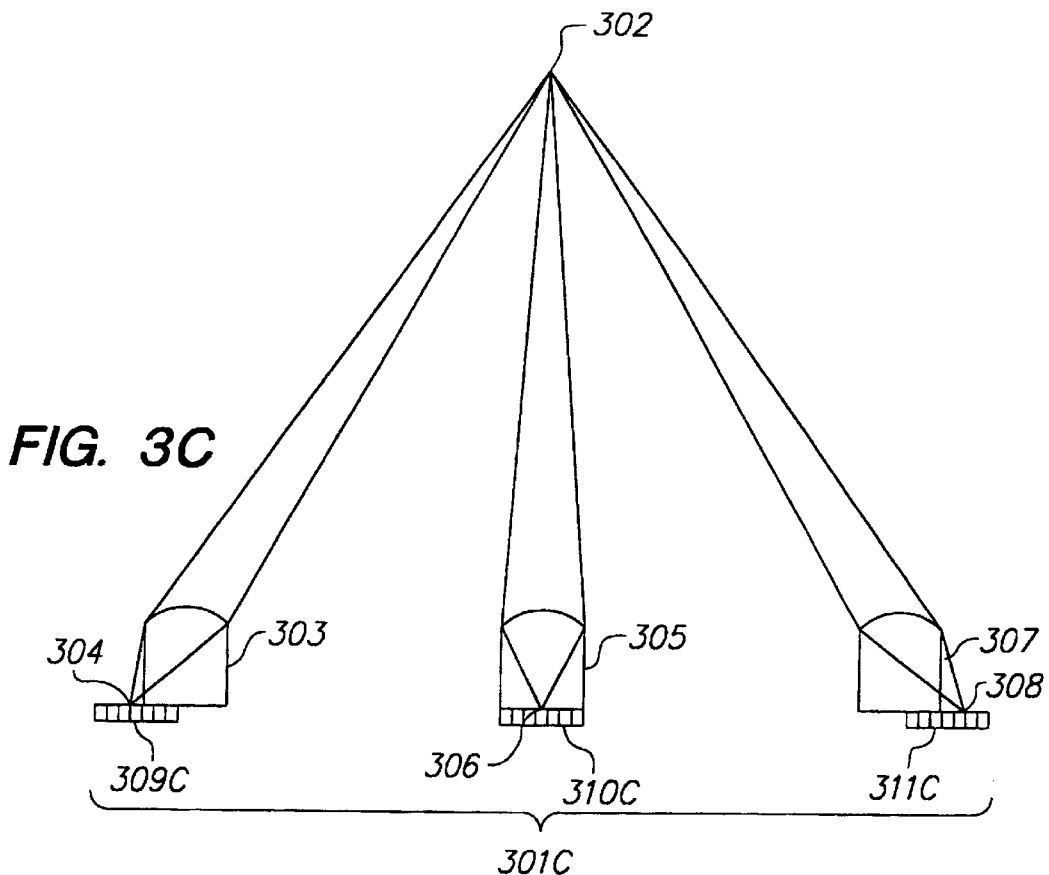
FIG. 3C is a schematic representation of a lenticular screen and print columns showing the necessary adjustment to optimize the viewing angle.

In order to view an entire stereoscopic image, the focal points of all of the lenticules must fall within the boundaries of the print areas, corresponding to each of the lenticules. FIG. 3C illustrates an embodiment of a lenticular stereogram in which the focal points of all the lenticules fall within their corresponding print areas which have been horizontally shifted. The shifted print areas eliminate the parallax problem and allows the full image to be viewed from an observation point where the light rays between the observation point and lenticules are not parallel. The parallax problem is compensated for by horizontally shifting the print areas 309C and 311C relative to the lenticules 303 and 307 so that the focal points 304 and 308 are incident upon the centers of print areas 309C and 311C respectively. Print area 310C does not require shifting because the focal point 306 is already incident close to the center of the print area 310C.

In general, full stereoscopic image projection requires that the print columns on the left side of the print be shifted to the left and that the print columns on the right side of the print be shifted to the right for the focal point of each lenticule to fall upon the proper print area column. The distance which each column is horizontally shifted is a function of the angle at which each print column is observed is inversely proportional to the distance between the viewing point and the lenticular screen. The shifting of print area columns increases as the observation point gets closer to the lenticular screen.

Figure 1C:
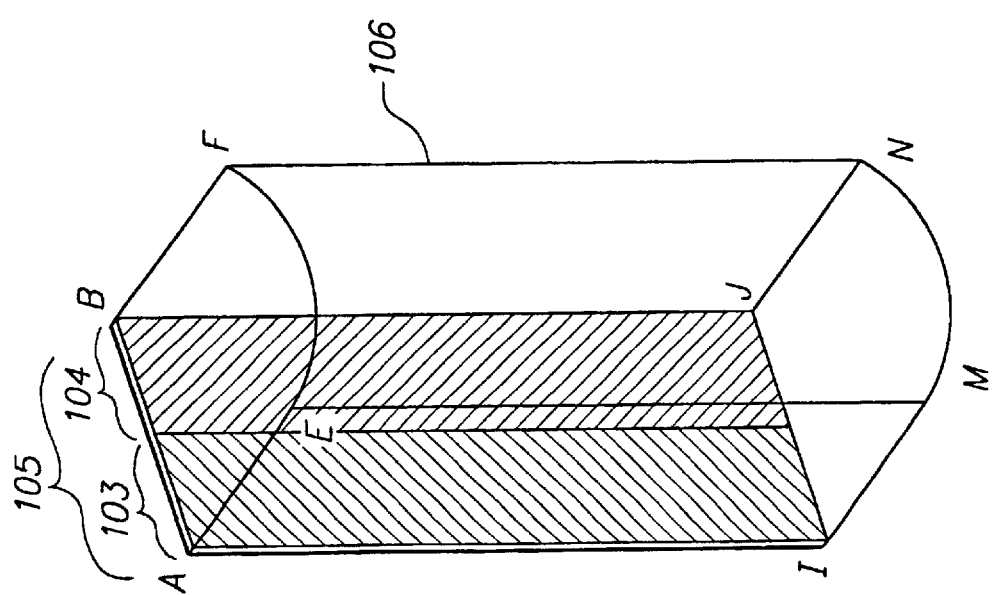
FIG. 1C is a perspective drawing showing the test target for calibrating the pitch of the print with respect to the pitch of the lenticular screen.

The inventive technique for maximizing the viewing zone of a lenticular stereogram uses the lenticular screen as a calibration and measurement tool to determine the optimum print column width for a specific viewing distance. FIG. 1C shows an embodiment of the present invention having a lenticule 106 and a corresponding print area 105 which is made up of two stripes 103 and 104. In the inventive technique, these two stripes are of complementary or contrasting color. For example, stripe 103 and stripe 104 may be black and white, or magenta and cyan, or green and red, respectively or any other condition of distinguishable colors. Full sized stereographic image prints with contrasting colors having precise column widths may be produced with an interdigitation computer program. Thus, a series of two color test prints can be made having an incrementally different image column widths. Image prints can be produced having a column width accuracy of 0.01 inch or better.

The two color test prints may be used with a stereogram image viewing device to determine the optimum image print column width for a specific viewing position. A lenticular stereogram image print produced with an optimum print column width will be fully viewable and have optimal three dimensional appearance. Because a single image print column width cannot be optimally viewed from all positions, the image print column width is designed for a specific viewing distance. Generally, the lenticular stereogram is designed to be viewed from a central position, however the distance at which the lenticular stereogram is viewed is variable.

Figure 2:
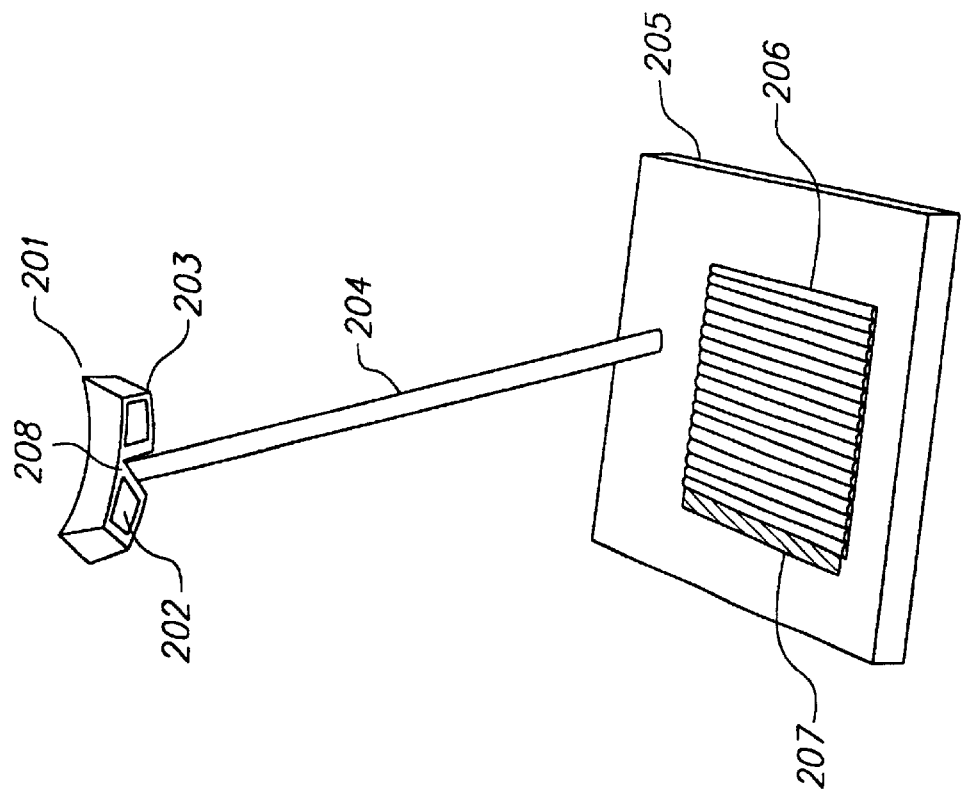
FIG. 2 is a drawing of the apparatus used to locate the observer while adjusting the lenticular screen and test target.

A stereogram image viewing devices may be used to view the two color test prints from a specific viewing position. An embodiment of a stereogram image viewing device is illustrated in FIG. 2 and includes: a location device 201 having eyeholes 202 and 203, a post 204 and a baseboard 205. The post 204 rigidly holds the location device 201 over the baseboard 205. The lenticular screen 206 is placed in intimate juxtaposition with the print 207 such that the center lenticule is directly over the center print column. The aligned print 207 and lenticular screen 206 are placed directly under the viewing device 201, such that the lenticules are vertically oriented relative to the viewer and the center of the print 207 is centered below a mid-point 208 between eyeholes 202 and 203. A viewer observes the print 207 through the eyeholes 202 and 203. In an alternative embodiment, digital cameras are positioned to view the print 207 as if from eyeholes 202 and 203.

If the width of the print columns is optimum with the focal points of the lenticules each falling upon proper columns of the print areas (as illustrated in FIG. 3C), the image 207 will appear to be one uniform color from eyehole 202 and the complementary or contrasting uniform color from eyehole 203. Imperfections in the test print or lenticular screen may cause slight imperfections in the viewed images. A test print having an improper print column width will not appear to be uniform in color. By observing a series of test prints with different print image column widths through the stereogram viewing device, the print having the most uniform observed colors from the eyeholes 202 and 203 may be rapidly determined. The best column width dimension for this test print is input into the interdigitation program to produce stereographic image prints having the optimum image column width and an optimized viewing zone.

Observation of the print through the stereogram image viewing apparatus and lenticular screen is a highly accurate measurement tool which allows the optimum print image column width to be quickly determined. In the art, the term pitch is often used to describe the print column width or the lenticule width. Pitch is the number of columns, or number of lenticules, per inch. If the print/lenticular screen combination is viewed from some great distance, the pitch of the print columns and lenticules are equal. In another example, at a viewing distance of 3 feet, a lenticular screen having a nominal pitch of 58.23 produces a maximum viewing zone when used with a print having a pitch of 58.35, i.e. 58.35 columns per inch. A stereographic print which has been optimized for a viewing distance of three feet also produce good stereographic imaging from a viewing distance of approximately two to five feet.

There are also many variations in the basic inventive technique. The inventive technique may be used for rear-projection slides as well as calibration or alignment of motion pictures, electronic images and lenticular screens used with electronic displays and combinations of these known displays. In particular computers may incorporate a lenticular screen and an interdigitation program which allows the test images to be projected so that the optimum viewing zone may be determined for a particular user. The computer would then display stereographic images having the optimum column width magnification in optical alignment with the lenticular screen. Alignment of the projected image with the lenticular screen may be achieved via the display controls or software.

In another embodiment, a series of print patterns having different column widths that may be viewed from a single location by a single eye. An appropriate series of test patterns having different column dimensions may be used to empirically calibrate the optimum width and location of the image print columns with respect to the lenticules and optimize the viewing zone.

Figure 4:
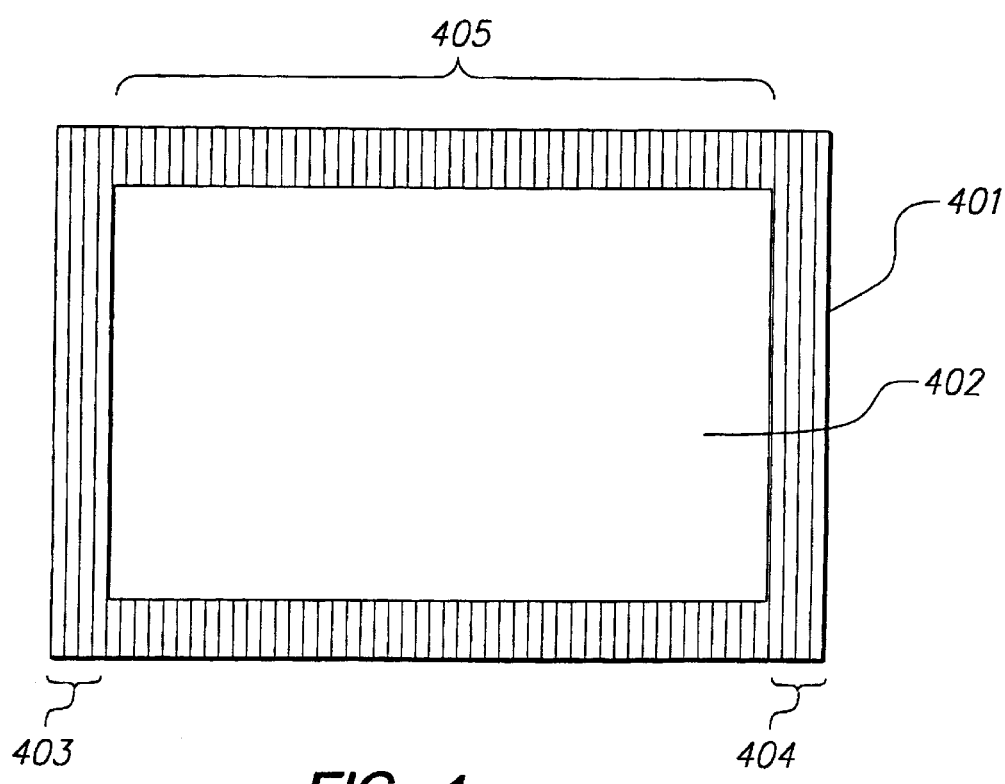
FIG. 4 is a test border and columnar stereogram print or projected display.

In another embodiment, a two color test print may also be combined with image prints for alignment purposes. Referring to FIG. 4, a print 401 having a two color border pattern 407 and a picture area 402 may be aligned using the described alignment method with a lenticular screen such that the viewing zone is located centrally over the of the print 401 and not skewed to the left or right. A lenticular screen is placed over the print 401 and the print 401 is viewed through the stereogram viewing device. The two color border pattern 407 is then aligned and centered with the lenticular screen when the border appears to be one color when viewed with the right eye and the contrasting color when viewed with the left eye.

Again referring to FIG. 4, in another embodiment, a first two color pattern may be used in horizontal border areas 405 and 407 and a second two color pattern of another type may be used for the vertical border areas 403 and 404. For example, alternating black and white stripes may be used within the columns of vertical regions 403 and 404, and alternating red and green stripes may be used for the horizontal regions 405 and 406. The black and white stripes in regions 403 and 404 may be used for rotational alignment of the lenticules with respect to the stereographic print columns. Observing the print through the imaging device, the one eye will observe the vertical border areas 403 and 404 as black and the other eye will observe the vertical border areas 403 and 404 as white. The red and green stripes in regions 405 and 406 may be used for central alignment of the stereographic print with the lenticular screen by aligning the two color column at the center of the print 401. Again one eye will see regions 405 and 406 as green and the other eye will see regions 405 and 406 as red.

A method for maximizing a viewing zone of a lenticular stereogram has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

I claim:

1. A method of optimizing the viewing zone of a lenticular stereogram, comprising:
   a. providing a test image in intimate juxtaposition with a lenticular screen, wherein the test image includes a plurality of columns each corresponding to an individual lenticule of the lenticular screen, and wherein each column of the test image has a predefined column width and includes at least a first stripe of a first color and a second stripe of a second color alternating with each other, and wherein the first color and the second color are visually distinct;
   b. observing the test image and lenticular screen from a specified viewing position with a viewing device, wherein the viewing device includes a first eye perspective viewer and a second eye perspective viewer;
   c. determining an optimum column width for an interdigitated stereoscopic image, wherein the optimum column width is obtained when the first color is observed with the first eye perspective viewer while the second color is observed with the second eye perspective viewer in step b;
   d. providing a modified test image if the optimum column width is not obtained in step c and then repeating steps b and c with the modified test image, wherein the modified test image is identical to the test image except that the column width is altered; and
   e. producing a stereoscopic image for use in a lenticular stereogram, wherein the stereoscopic image includes interdigitated columns each having the optimum column width.

2. The method of optimizing the viewing zone of a lenticular stereogram of claim 1, further comprising aligning a central one of the plurality of columns with a center lenticule of the lenticular screen.

3. The method of optimizing the viewing zone of a lenticular stereogram of claim 1, wherein the first color contrasts with the second color.

4. The method of optimizing the viewing zone of a lenticular stereogram of claim 1, wherein the first color and the second color are selected from the group consisting of: black and white, magenta and cyan, or green and red, respectively.

5. The method of optimizing the viewing zone of a lenticular stereogram of claim 1, wherein an interdigitation program is used to adjust the column width of the plurality of columns.

6. The method of optimizing the viewing zone of a lenticular stereogram of claim 1, wherein a pair of human eyes are used to view the test image from the first eye perspective viewer and from the second eye perspective viewer.

7. The method of optimizing the viewing zone of a lenticular stereogram of claim 1, wherein a pair of digital cameras are used to view the test image from the first eye perspective viewer and from the second eye perspective viewer.

8. A method of optimizing the viewing zone of a lenticular stereogram, comprising:
   a. providing a plurality of test images, wherein each test image has a plurality of columns each having the same column width and wherein the column width differs by a known amount for each test image, and wherein each column includes at least a first stripe of a first color and a second stripe of a second color alternating with each other, and wherein the first color and the second color are visually distinct;
   b. holding a first of the test images in intimate juxtaposition with a lenticular screen;
   c. observing the test image from a specified viewing position with a viewing device, wherein the viewing device includes a first eye perspective viewer and a second eye perspective viewer,
   d. determining an optimum column width for an interdigitated stereoscopic image, wherein the optimum column width is obtained when the first color is observed with the first eye perspective viewer while the second color is observed with the second eye perspective viewer in step b;
   e. substituting another of the test images if the optimum column width magnification was not obtained in step d and repeating steps b, c and d; and
   f. producing a stereoscopic image for use in a lenticular stereogram, wherein the stereoscopic image includes interdigitated columns each having the optimum column width.

9. The method of optimizing the viewing zone of a lenticular stereogram of claim 8, further comprising aligning a central interdigitated column of the stereoscopic image print or the projected image with a center lenticule of the lenticular screen.

10. The method of optimizing the viewing zone of a lenticular stereogram of claim 8, wherein the first color contrasts with the second color.

11. The method of optimizing the viewing zone of a lenticular stereogram of claim 8, wherein the first color and the second color are selected from the group consisting of: black and white, magenta and cyan, or green and red, respectively.

12. The method of optimizing the viewing zone of a lenticular stereogram of claim 8, wherein an interdigitation program is used to produce the plurality of test prints or the plurality of test projected images.

13. The method of optimizing the viewing zone of a lenticular stereogram of claim 8, wherein a pair of human eyes are used to view the test print from the first eye perspective viewer and from the second eye perspective viewer.

14. The method of optimizing the viewing zone of a lenticular stereogram of claim 8, wherein a pair of cameras are used to view the test print from the first eye perspective viewer and from the second eye perspective viewer.

15. A method of optimizing the viewing zone of a lenticular stereogram, comprising:
   a. providing a plurality of test images, wherein each test image has a plurality of columns each having the same column width and wherein the column width differs by a known amount for each test image, and wherein each column includes at least a first stripe of a first color and a second stripe of a second color alternating with each other, and wherein the first color and the second color are visually distinct;
   b. holding a first of the test images in intimate juxtaposition with a lenticular screen;
   c. observing the first test image from a specified viewing position with a viewing device, wherein the viewing device includes a first eye perspective viewer and a second eye perspective viewer, d. determining an optimum column width for an interdigitated stereoscopic image, wherein the optimum column width is obtained when the first color is observed with the first eye perspective viewer while the second color is observed with the second eye perspective viewer in step b;

e. substituting another of the test images if the optimum column width magnification was not obtained in step c and repeating steps b, c and d;

f. producing a stereoscopic image for use in a lenticular stereogram, wherein the stereoscopic image includes interdigitated columns each having the optimum column width.

16. A method of optimizing the viewing zone of a lenticular stereogram having a lenticular screen in intimate juxtaposition with a stereo image pair, wherein the lenticular screen includes a plurality of individual lenticules and the stereo image pair includes a plurality of columns of preset column width each corresponding to an individual lenticule, each of said columns having alternating image stripes of left eye perspective images and right eye perspective images, comprising adjusting the column width to obtain optical alignment of each column with its corresponding lenticule for a specified viewing position, wherein the adjusting step comprises:

a. providing a series of test images, wherein each test image includes a plurality of columns each corresponding to an individual lenticule of the lenticular screen, and wherein each column has a preset column width, the preset column width being different for each of the test images, and wherein each column includes at least a first stripe of a first color and a second stripe of a second color alternating with each other, and wherein the first color and the second color are visually distinct;

b. holding a first of the test images in intimate juxtaposition with the lenticular screen;

c. observing the test image and lenticular screen from a specified viewing position with a viewing device, wherein the viewing device includes a first eye perspective viewer and a second eye perspective viewer;

d. determining an optimum column width for the stereo image pair to be viewed from the specified viewing position, wherein the optimum column width is obtained when the first color is observed with the first eye perspective viewer while the second color is observed with the second eye perspective viewer in step c;

e. providing another of the test images if the optimum column width is not obtained in step d and then repeating steps c and d; and f. producing the stereo image pair to have interdigitated columns each having the optimum column width.

* * * * *